United States Patent [19]

Kusumoto et al.

[11] Patent Number: 4,978,992
[45] Date of Patent: Dec. 18, 1990

[54] ORIGINAL SIZE DETECTING APPARATUS OF AN IMAGE FORMING APPARATUS

[75] Inventors: Keiji Kusumoto; Toshikazu Kawaguchi; Kenzo Nagata, all of Osaka, Japan

[73] Assignee: Minolta Camera Kabushiki Kaisha, Osaka, Japan

[21] Appl. No.: 300,606

[22] Filed: Jan. 19, 1989

[30] Foreign Application Priority Data

Jan. 20, 1988 [JP] Japan .................................. 63-11750
Jan. 20, 1988 [JP] Japan .................................. 63-11751
Jan. 20, 1988 [JP] Japan .................................. 63-11752

[51] Int. Cl.$^5$ ...................... G03B 27/50; G03G 15/00
[52] U.S. Cl. ........................................ 355/51; 355/75; 355/311
[58] Field of Search .................... 355/75, 51, 233, 311, 355/243, 204

[56] References Cited

U.S. PATENT DOCUMENTS 4,568,181 2/1986 Nishiyama ............................ 355/75
4,695,154 9/1987 Watanabe ............................ 355/243

FOREIGN PATENT DOCUMENTS 3222650 1/1983 Fed. Rep. of Germany .
60-4974 2/1985 Japan .
2131185 6/1984 United Kingdom .

Primary Examiner—L. T. Hix
Assistant Examiner—Della Rutledge
Attorney, Agent, or Firm—Willian Brinks Olds Hofer Gilson & Lione

[57] ABSTRACT

When preliminary scanning is started, a reference signal is generated from a reference position sensor and a moving amount of the scanner is measured by counting. Change in intensity of the reflected light from a platen is detected by a first sensor according to movement of the scanner. When the detected intensity attains reference intensity, the moving amount of the scanner is stored. When the detected intensity attains again the reference intensity after it has been lower than the reference intensity, the stored moving amount of the scanner is updated. The time in which the detected intensity attains the reference intensity is measured and when it attains a predetermined time, absence of the original is determined and the scanner stops and returns. The size of the original is determined based on the moving amount of the scanner stored at that time.

22 Claims, 13 Drawing Sheets

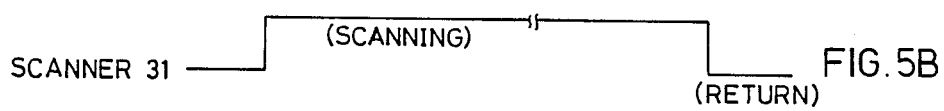
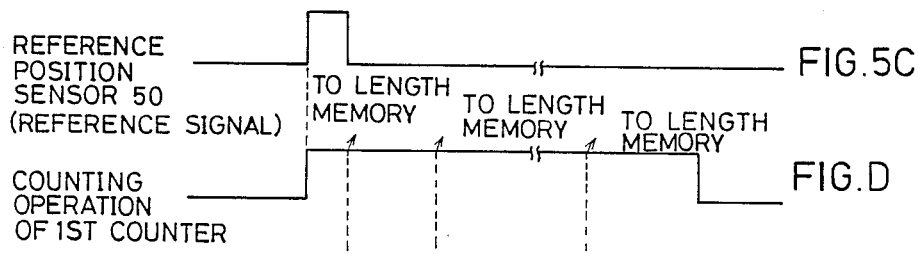
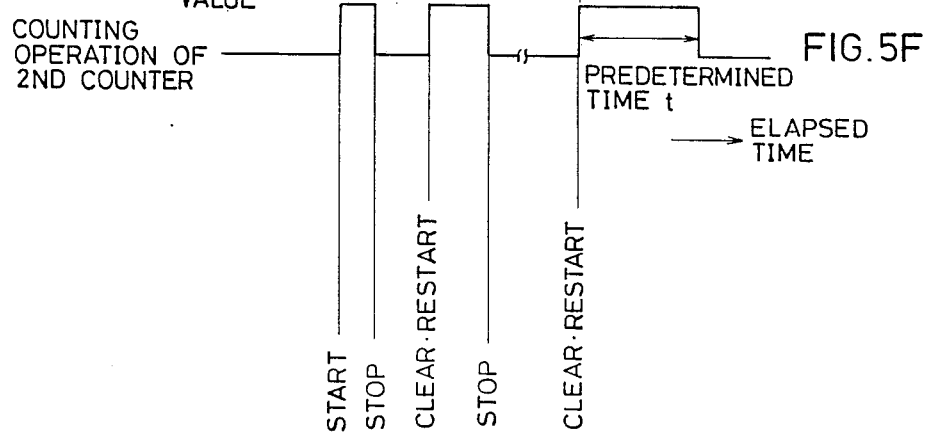

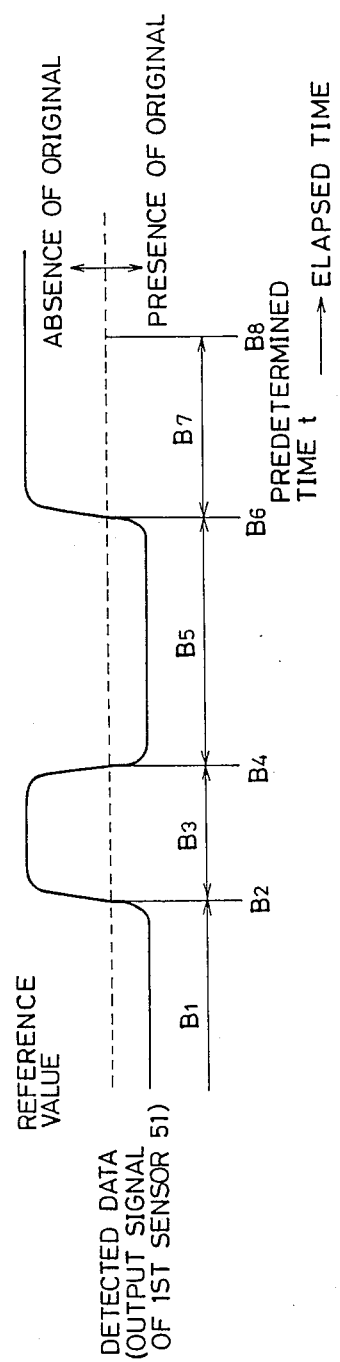

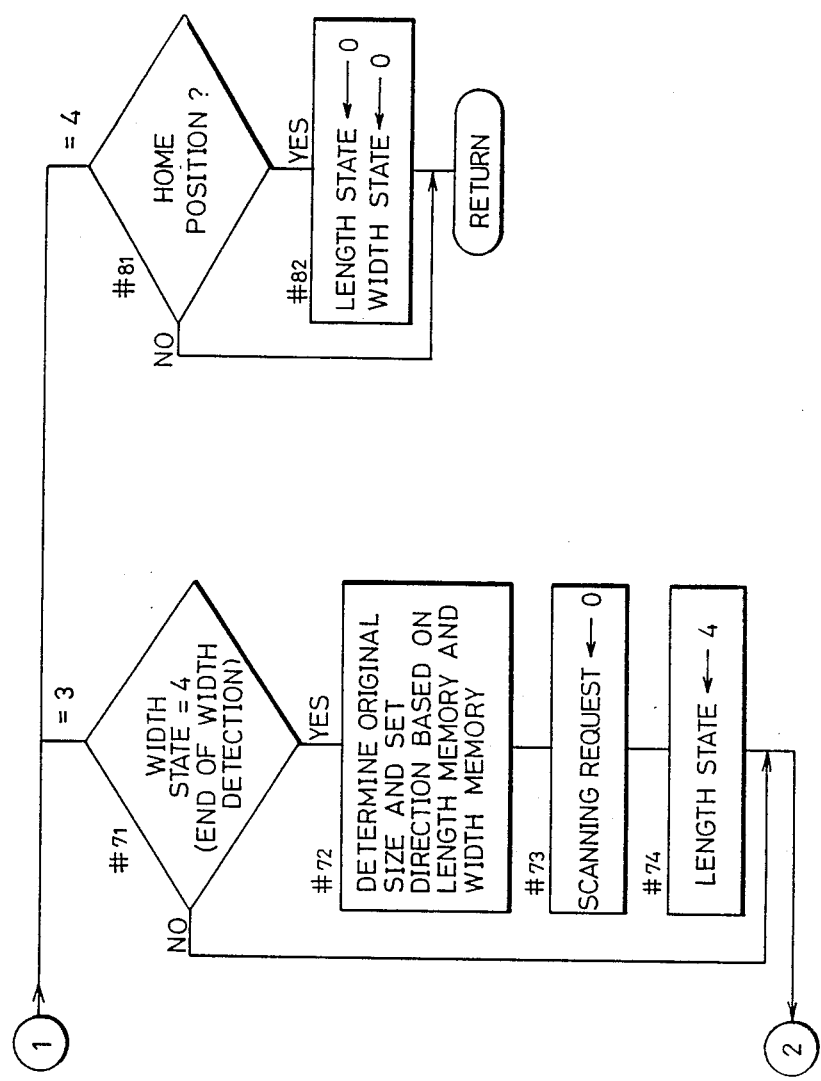

ORIGINAL SIZE DETECTING APPARATUS OF AN IMAGE FORMING APPARATUS

BACKGROUND OF THE INVENTION

1. Field of the Invention

The present invention relates to an original size detecting apparatus for detecting a size (a length) of an original placed on a document platen in an image forming apparatus such as a copying machine or an image reader.

2. Description of the Related Art

A conventional image forming apparatus such as a copying machine or an image reader is provided with an original size detecting apparatus for automatically detecting a size of an original placed on a document platen. Copy paper of a suitable size is selected according to the detected original size or the lens is moved according to the original size and a copying magnification.

The conventional original size detecting apparatus comprises a photosensor for receiving light reflected from an original and outputting a signal according to the intensity of the light, a comparator for comparing the output signal of the photosensor with a specified reference value independent of the original size and outputting a signal indicating presence or absence of the original, whereby the original size is determined when the signal is outputted from the comparator (as indicated in Japanese Patent Publication No. 4974/1985).

However, there are various densities and patterns of originals and intensity of light from an original varies considerably dependent on the density or pattern. For this reason, it is very difficult to set a reference value for determining presence or absence of various originals. In addition, it may occur that the intensity of the reflected light exceeds the reference value in spite of the presence of the original to output a signal indicating absence of an original, and thus it is difficult to detect presence or absence of an original reliably.

Consequently, in the above described conventional original size detecting apparatus, it may happen that the length of an original is determined to be shorter than the actual length, that is, the original size is determined to be smaller than the actual size.

SUMMARY OF THE INVENTION

An object of the present invention is to eliminate errors in detection of an original size in an original size detecting apparatus.

Another object of the present invention is to accurately detect an original size independent of changes of light reflected from an original in an original size detecting apparatus.

Still another object of the present invention is to prevent erroneous determination that the length of an original is smaller than the actual length in an original size detecting apparatus.

A further object of the present invention is to effect scanning of an original efficiently in an original size detecting apparatus.

A still further object of the present invention is to terminate scanning according to the length of an original in an original size detecting apparatus.

A still further object of the present invention is to reduce time required for preliminary scanning.

A still further object of the present invention is to correctly determine a direction of setting an original in an original size detecting apparatus.

A still further object of the present invention is to correctly determine a width of an original in a direction perpendicular to the scanning direction in an original size detecting apparatus.

A still further object of the present invention is to effect detection with high reliability in an original size detecting apparatus.

In order to accomplish the above described objects, an original size detecting apparatus according to an aspect of the invention includes a platen, irradiating means, light intensity detecting means, performing means, moving amount measuring means, light intensity detecting means, storing means and original size determining means. An original is placed on the platen. The irradiating means irradiates the platen where the original is placed. The light intensity detecting means receives light reflected from the platen irradiated by the irradiating means and detects intensity of the reflected light. The performing means performs relative movement between the platen and the light intensity detecting means while activating the irradiating means. The moving amount measuring means moves the amount of the relative movement. The reference level detecting means detects coincidence between the output of the light intensity detecting means and the reference level. The storing means stores the amount measured by the moving amount measuring means, in response to the output of the reference level detecting means. The original size determining means determines the size of the original based on the amount of the relative movement finally stored in the storing means, after the end of the relative movement.

In order to accomplish the above described objects, an original size detecting apparatus according to another aspect of the invention includes a platen, irradiating means, first light intensity detecting means, performing means, moving amount determining means, first detecting means, storing means, measuring means, second detecting means, and original size determining means. An original is placed on the platen. The irradiating means irradiates the platen on which the original is placed. The first light intensity detecting means receives light reflected from the platen irradiated by the irradiating means and determines intensity of the received reflected light. The performing means performs relative movement between the platen and the light intensity detecting means while activating the irradiating means. The moving amount measuring means measures the amount of the relative movement. The first detecting means detects coincidence between the output of the light intensity detecting means and a reference level. The storing means stores the amount measured by the moving amount measuring means, in response to the output of the first detecting means. The measuring means measures the duration of time from the time of the coincidence till the output of the first detecting means is reduced under the reference level. The second detecting means detects the fact that the time measured by the measuring means attains a predetermined time. The original size determining means determines the size of the original based on the amount stored in the storing means, in response to the output of the second detecting means.

In order to accomplish the above described objects, an original size detecting apparatus according to a further aspect of the invention includes a platen, irradiating means, first light intensity detecting means, second light intensity detecting means, performing means, moving amount measuring means, first detecting means, storing means, comparing means, first original length determining means, and second original length determining means. An original is placed on the platen. The irradiating means irradiates the platen on which the original is placed. The first light intensity detecting means receives light reflected from a first position of the platen irradiated by the irradiating means and determines intensity of the reflected light thus received. The second light intensity detecting means receives light reflected from a second position different from the first position of the platen and determines intensity of the reflected light thus received. The performing means performs relative movement between the platen and the light intensity detecting means while activating the irradiating means. The moving amount measuring means measures the amount of the relative movement. The first detecting means detects the fact that the output of the first light intensity detecting means attains a first reference level. The storing means stores the amount measured by the moving amount measuring means, in response to the output of the first detecting means. The comparing means compares the output of the second light intensity detecting means with a second reference level. The first original length determining means determines the length of the original along the moving direction of the relative movement based on the amount stored in the storing means when the output of the first light intensity detecting means is brought into a predetermined state after the first light intensity detecting means provides an output. The second original length determining means determines the length of the original in a direction perpendicular to the moving direction of the relative movement, based on the output of the comparing means.

In order to accomplish the above described objects, an original size detecting method according to a still further aspect of the present invention includes the steps of: placing an original on a platen, irradiating the platen with a predetermined area for scanning, measuring an amount of scanning for the platen with passage of time, receiving light reflected from the platen irradiated, measuring intensity of the reflected light thus received with passage of time, measuring the elapsed time in a state in which the intensity of the received reflected light attains a reference intensity and detecting the size of the original based on the measured scanning amount when the elapsed time exceeds a predetermined time.

Thus, according to the present invention, even if information indicating absence of an original is obtained based on a change in intensity of the reflected light, processing in the case of absence of the original is effected only after that condition has continued for a predetermined time. Accordingly, erroneous detection due to change in the intensity of the reflected light from the original itself or the platen can be reduced and the original size can be detected correctly and with high reliability.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5A–5E are timing charts showing signal conditions when an original size is detected by preliminary scanning according to the embodiment of the invention.

FIG. 6 is a timing chart showing an example of change of detected data for explaining operation of detecting a length of an original according to the embodiment of the invention.

FIGS. 10A to 10D are flow charts showing concrete procedures of the original size detecting routine of FIG. 7.

DESCRIPTION OF THE PREFERRED EMBODIMENTS

In the following, an embodiment of the present invention will be described with reference to the drawings.

Figure 1:
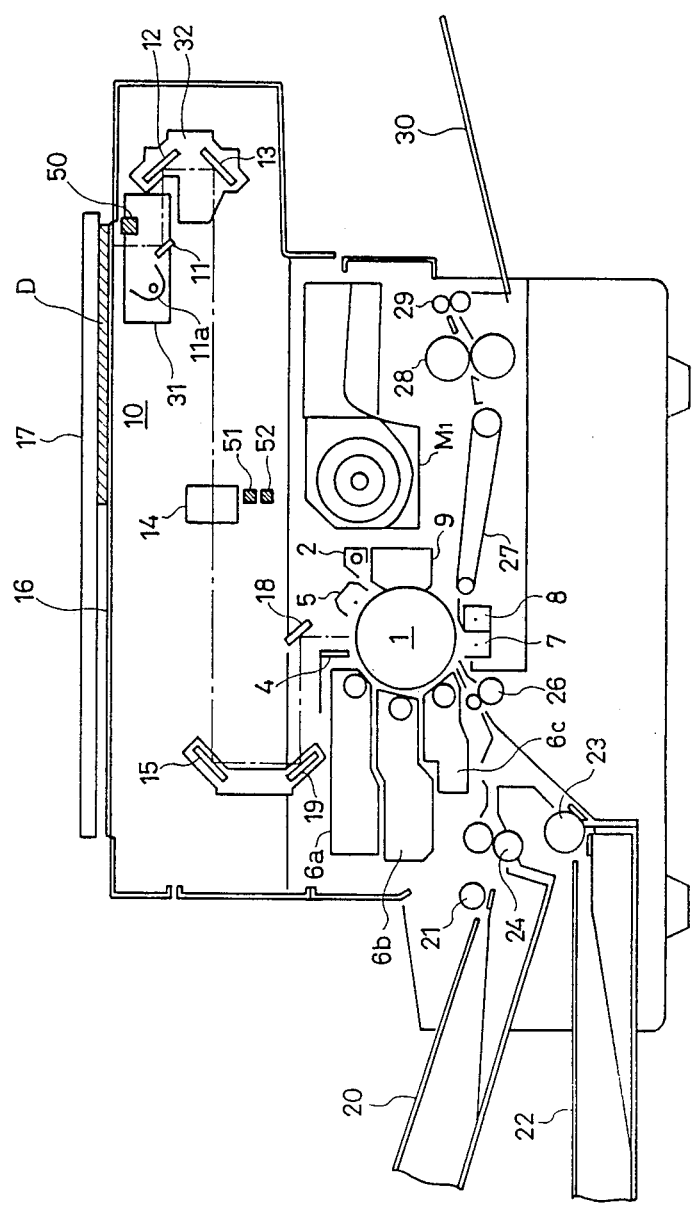
FIG. 1 is a front sectional view showing a construction of a copying apparatus according to an embodiment of the invention.

FIG. 1 is a front sectional view showing a general construction of a copying apparatus. A photoconductive drum 1 rotatable counterclockwise is provided nearly at the center of the main body of the copying apparatus. A main eraser lamp 2, an LED array 4, a corona charger 5, developing units 6a, 6b and 6c, a transfer charger 7, a separation charger 8, and a cleaning device 9 of a blade type are provided around the photoconductive drum 1. The photoconductive drum 1 has its surface provided with a photoconductive layer. When the drum 1 passes along the eraser lamp 2 and the corona charger 5, its surface is uniformly charged and then exposed to an image from an optical system 10.

The optical system 10 is provided under a platen glass 16 to scan an image of an original D. It comprises a light source 11a, movable mirrors 11, 12 and 13, a lens 14, and fixed mirrors 15, 18 and 19. A scanner 31 comprising the light source 11a and the movable mirror 11 moves at a speed v/n (n being a copying magnification) with respect to a rotating speed v of the photoconductive drum 1 and a slider 32 comprising the movable mirrors 12 and 13 is driven by a scan motor so as to move at a speed v/2n.

An original cover 17 has a lower surface, which serves to press the original D, and it is colored in yellow to make it easy to optically detect presence/absence of the original D.

Figure 2:
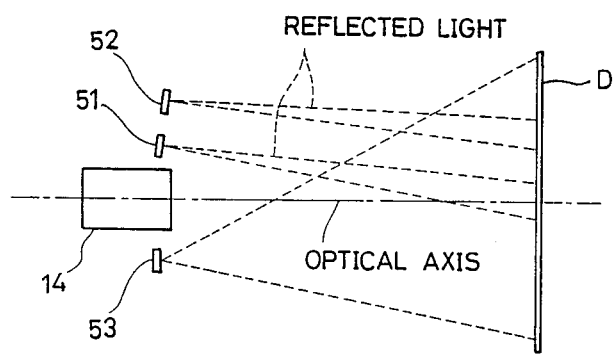
FIG. 2 is an illustration showing development on line coordinates of the optical path shown in FIG. 1.

FIG. 2 is an illustration showing development in straight lines of the light emitted from the light source 11a and reflected from the original D to the lens 14, the first sensor 51 and the second sensor 52 through a light path of the optical system 10.

Referring to FIG. 1, a reference position sensor 50 which turns on and off by movement of the scanner 31 is provided under a top end of the platen glass 16. As a result, a leading edge position of the original is detected at the time of scanning the original D or reading the original size and a reference signal is outputted. A first sensor 51 and a second sensor 52 for receiving light emitted from the light source 11a and reflected from the original D and detecting presence/absence of the original at a specified position in the longitudinal and transverse directions of the original D are provided near the lens 14.

The first sensor 51 detects the length direction of the original D (that is, the scanning direction of the scanner 31) and it is located to receive light reflected from the original D during preliminary scanning of the scanner 31, with respect to originals of all specified sizes to be placed on the platen glass 16. More specifically, in the case of a copying apparatus which sets the original D to a central position of the platen glass 16 in the transverse direction, the first sensor 51 is located for sensing a center in the transverse direction of the platen glass. The first sensor 51 receives reflected light from the central position of the original D by preliminary scanning.

The second sensor 52 receives reflected light from the position of the original different from the first sensor 51 and detects the direction of setting the original D on the platen glass 16, that is, determines whether the original D is placed in the longitudinal direction along the scanning direction or in the transverse direction on the platen glass 16. For example, in the case of an original of the A4 size or the B5 size, the second sensor 52 is located toward a position where light reflected from the original placed in the longitudinal direction is not received and only the light reflected from the original placed in the transverse direction can be received. More specifically, the second sensor 52 is located at a position distant from the first sensor 51 by a predetermined distance in a direction (the direction penetrating the paper surface of FIG. 1) perpendicular to the scanning direction.

Since each of those first and second sensors 51 and 52 has a blue transmission filter and the original cover is colored in yellow, the original D can be easily detected optically. The AE sensor 53 effects automatic exposure adjustment and detects the density of the original D.

On the other hand, on the left side of the main body of the copying apparatus, there are an upper feed portion 20 and a lower feed portion 22 provided with feed rollers 21 and 23, respectively. Copy paper fed from either feed portion moves through a transport path including a roller pair 24, a timing roller pair 26, a transport pair 27, a fixing device 28 and a discharge roller 29. During this movement, an image on the photoconductor drum 1 is transferred onto the copy paper and fixed by the fixing device 28 and the copy paper is discharged onto the discharge tray 30.

Figure 3:
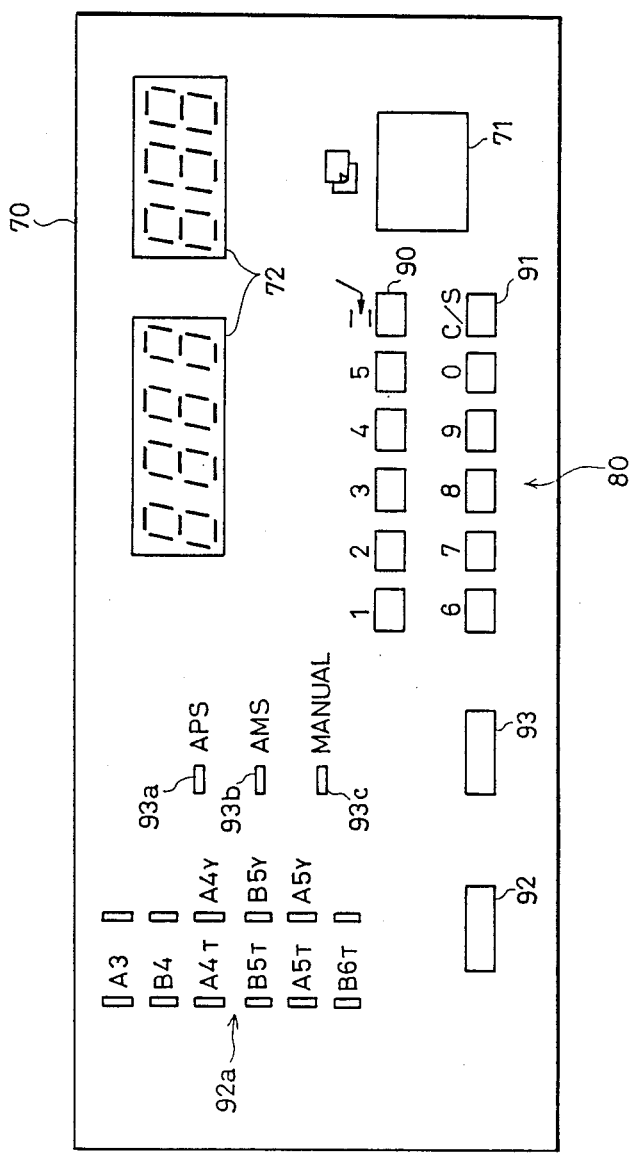
FIG. 3 is a plan view of an operation panel provided on the upper surface of the copying apparatus of FIG. 1.

FIG. 3 is a plan view of an operation panel provided on the upper surface of the copying apparatus.

The operation panel 70 comprises: a print start key 71 for starting copy operation; display portions 72 formed by 7-segment LEDs or the like on which the number of copies and other information are displayed; ten-key pads 80 including ten numerical value keys from 0 to 9 for inputting the number of copies and the like; an interruption key 90 for designating interruption copy; a clear stop key 91; a paper selection key 92 for designating any of copy paper sheets in paper feed cassettes attached in multiple stages according to the size and the longitudinal or transverse direction; paper display elements 92a for displaying the size and the longitudinal or transverse direction of the selected copy paper; a mode switching key 93 for successively switching among an automatic paper selection mode, an automatic magnification selection mode and a manual mode; mode display elements 93a to 93c for displaying the selected mode, etc. In addition, though not shown, the operation panel 70 comprises an upkey and a downkey for changing and setting the density of a copy image by steps; a density display portion for displaying the set density; a magnification setting key for manually setting a copying magnification; a magnification display portion for displaying the set magnification, etc.

Figure 4:
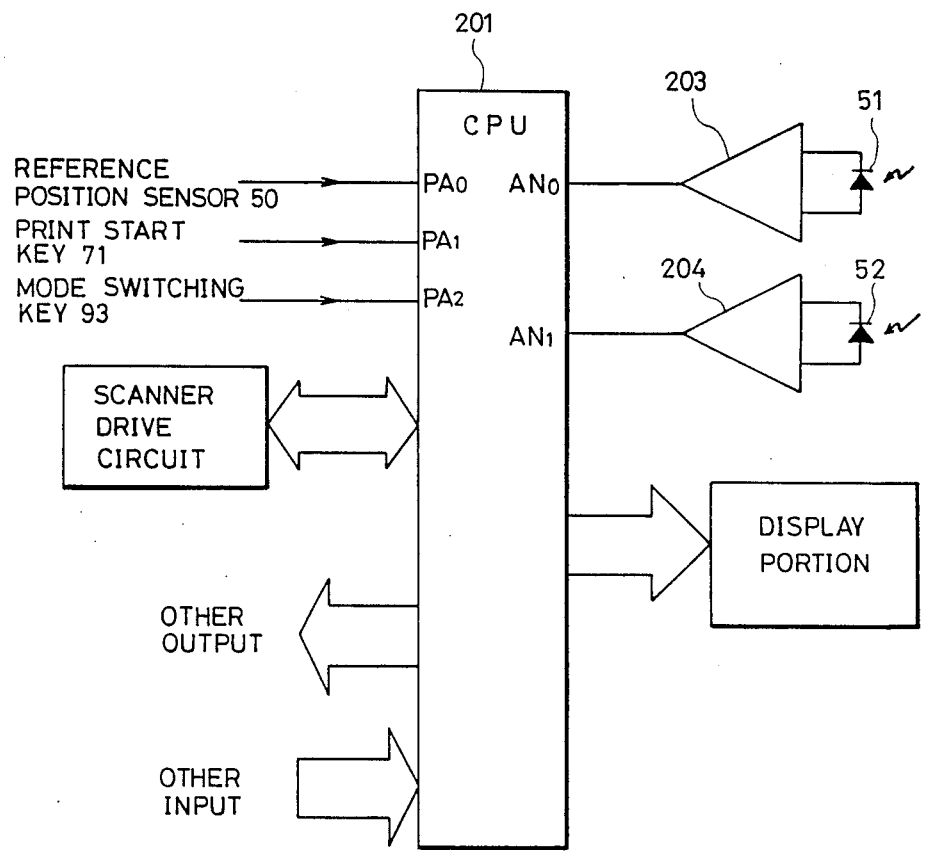
FIG. 4 is a circuit diagram showing a control circuit of a copying apparatus according to an embodiment of the invention.

FIG. 4 is a circuit diagram showing a control circuit of the copying apparatus.

An analog input terminal of a CPU 201 formed by a microcomputer is connected with amplifiers 203 and 204 for amplifying the outputs of the first and second sensors 51 and 52, and various keys as described above, display elements and drive circuits of motors and clutches and the like are connected to the CPU 201.

In this embodiment, preliminary scanning in which the scanner 31 moves while irradiating the original D is effected to detect the size of the original D before exposure scanning for copy operation by the scanner 31. During the preliminary scanning, light reflected from the original is applied to the first and second sensors 51 and 52. The first and second sensors 51 and 52 output a signal according to intensity of the received light and the signal is amplified by the amplifiers 203 and 204 and then inputted to the CPU 201.

The CPU 201 digitally converts the signals inputted from the amplifiers 203 and 204 and detects the size and the set direction (the longitudinal or transverse direction) of the original by a program stored in the CPU 201, based on the data thus obtained and it executes control according to the original size and the set direction thereof.

A reference position sensor 50 is used to detect a leading edge of an image in copy operation and to obtain a reference signal serving as a reference point for measurement of the original length in preliminary scanning for detection of the original size.

FIGS. 5A-5F are timing charts showing signal conditions for detecting the original size by preliminary scanning. Referring to FIGS. 5A-5F, original size detecting operation will be described.

When an on-edge of the print start key 71 is detected, preliminary scanning is started and the scanner 31 starts to move in the scanning direction. When the scanner 31 reaches near a leading edge position of the original D, the scanner 31 operates the reference position sensor 50 and the reference signal is outputted from the reference position sensor 50.

With timing for outputting the reference signal, the first counter in the CPU 201 starts counting. The value of the first counter increases for every cycle.

The CPU 201 samples and digitally converts the signal from the first sensor 51 and uses it as detection data, whereby the detection data is compared with a predetermined reference value. If the data is larger than the reference value, it is determined that no original exists. If it is smaller than the reference value, it is determined that an original exists.

When the determination of the CPU 201 changes from presence of an original to absence of an original, the count value of the first counter at that time is stored in a length memory contained in the CPU 201. The content of the length memory is renewed each time when the determination changes from presence of an original to absence of an original and therefore only the newest count value is stored therein.

Simultaneously with the change from presence of an original to absence of an original, the second counter contained in the CPU 201 starts counting. The second counter thus started stops when the determination changes from absence of an original to presence of an original and the count value is cleared when the determination is changed again to absence of an original, whereby counting is started again.

When the count value of the second counter exceeds a predetermined value (predetermined time t), it is determined that the original D does not exist at a position corresponding to the scanner at that time, and the preliminary scanning is terminated to return the scanner 31 to the initial position (the home position)

After the preliminary scanning is terminated, the original length is determined by the count value stored finally in the length memory.

More specifically, the signal from the first sensor 51 changes dependent on the pattern or density of the original D and even if it is determined that no original exists although the original D actually exists, when the determination changes to presence of the original during the predetermined time t of counting by the second counter, only the count value at the time of next change to absence of an original is stored in the length memory and the original length is determined by the final count value.

Accordingly, even if intensity of light changes dependent on the pattern or density of the original, this does not influence the original length to be detected. Thus, even if absence of an original is determined during detection of the original, this determination is disregarded and a correct original length is detected without erroneous determination that the original length is shorter than the actual length.

The second sensor 52 detects the set direction of the original D as described previously and accordingly determines whether the longer sides of the original are along the scanning direction or not. After the above described reference signal is outputted, the CPU 201 samples and digitally converts the signal of the second sensor 52 (that is, the output of the amplifier 204) with predetermined cycles and compares the obtained data with a predetermined reference value. If the data is larger than the reference value, it is determined that an original does not exist. In the reverse case, it is determined that an original exists. If the number of the determinations of presence of the original out of a predetermined number of data is larger than a specified number, it is determined that the original D is set with the shorter sides thereof along the scanning direction.

Based on the results of determinations as to the original length and the set direction, the original size such as the A4, A5 or B5 size and the set direction are correctly detected. In addition, the length of the original D can be detected at the time when the predetermined time t has passed after the scanning of the length of the original D. More specifically, if the length of the original D is short, the scanner 31 does not need to effect full scanning over the whole length of the platen glass 16. It becomes possible to detect the original size by scanning for a short time and to prevent lowering of the first copy speed of the copying apparatus.

Referring now to flow charts of FIGS. 7 to 10, copy operation and original size detecting operation of the copying apparatus will be described.

Figure 7:
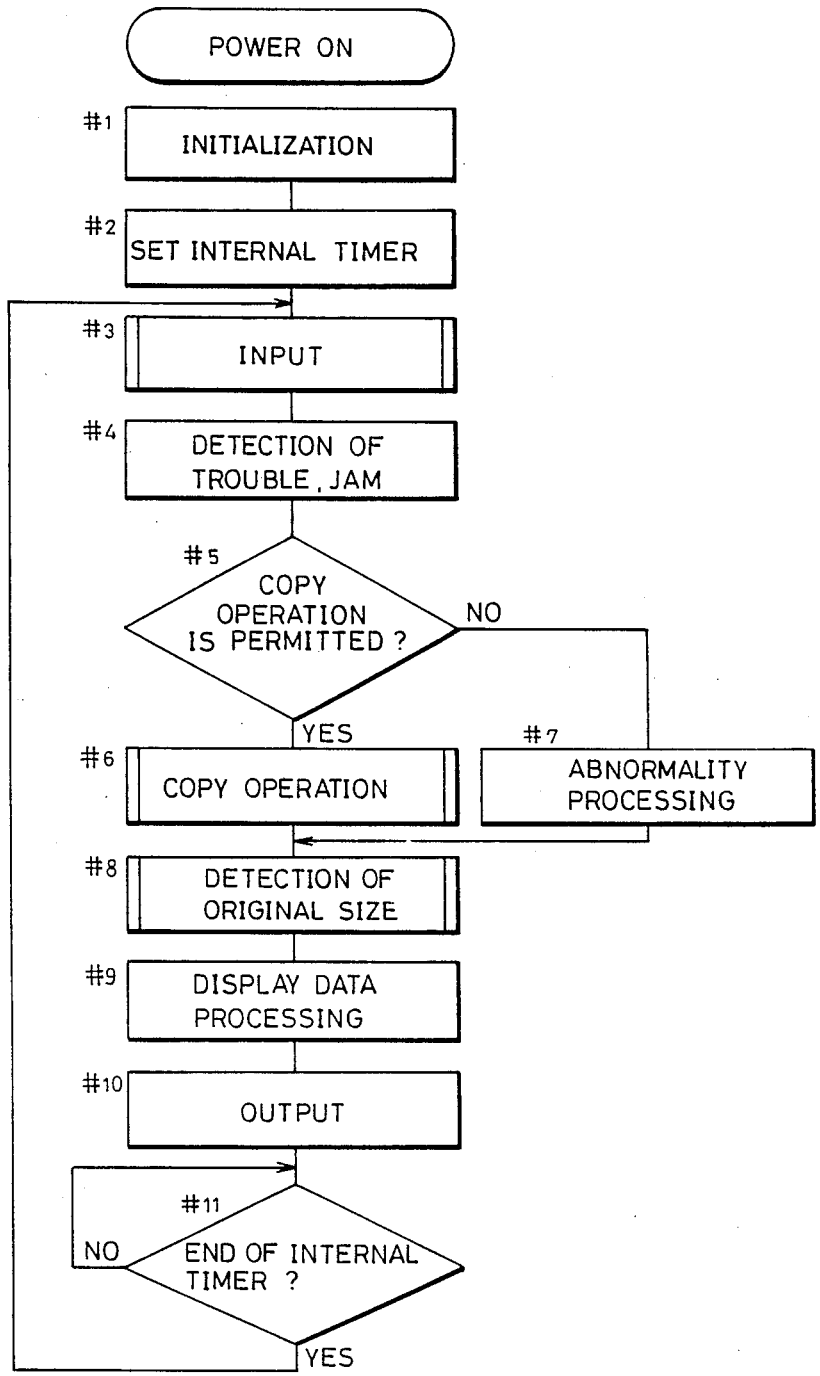
FIG. 7 is a flow chart showing a main routine of a CPU 201 according to the embodiment of the invention.

FIG. 7 is a main flow chart of the copying apparatus.

Initialization is effected in step 1 to set the CPU 201 to the initial state and to set the copying apparatus to the initial mode after turn-on of the power supply.

In step 2, an internal timer for defining a period of one routine is set. Thus, procedures of steps 3 to 10 are carried out for each predetermined time.

In step 3, an input routine is executed to input signals from various keys on the operation panel 70, the reference position sensor 50, the first sensor 51, the second sensor 52, the AE sensor 53 and other switches or sensors not shown.

In step 4, operation conditions of the copying apparatus such as occurrence of any trouble or paper jam are detected based on the input results of step 3. Based on the result of the detection, it is determined in step 5 whether copy operation is permitted or not.

If copy operation is permitted, a copy operation routine is executed in step 6. If it is not permitted, an abnormality processing routine is executed in step 7.

In step 8, an original size detection routine is executed to detect the original size.

In step 9, data displayed on the respective display portions of the operation panel 70 are processed and in step 10, the data are displayed or signals for controlling the respective components of the copying apparatus are outputted.

After the above mentioned procedures have been executed, there is a wait for an end of the previously set internal timer in step 11, so that the period of one main routine may be constant.

Figure 8:
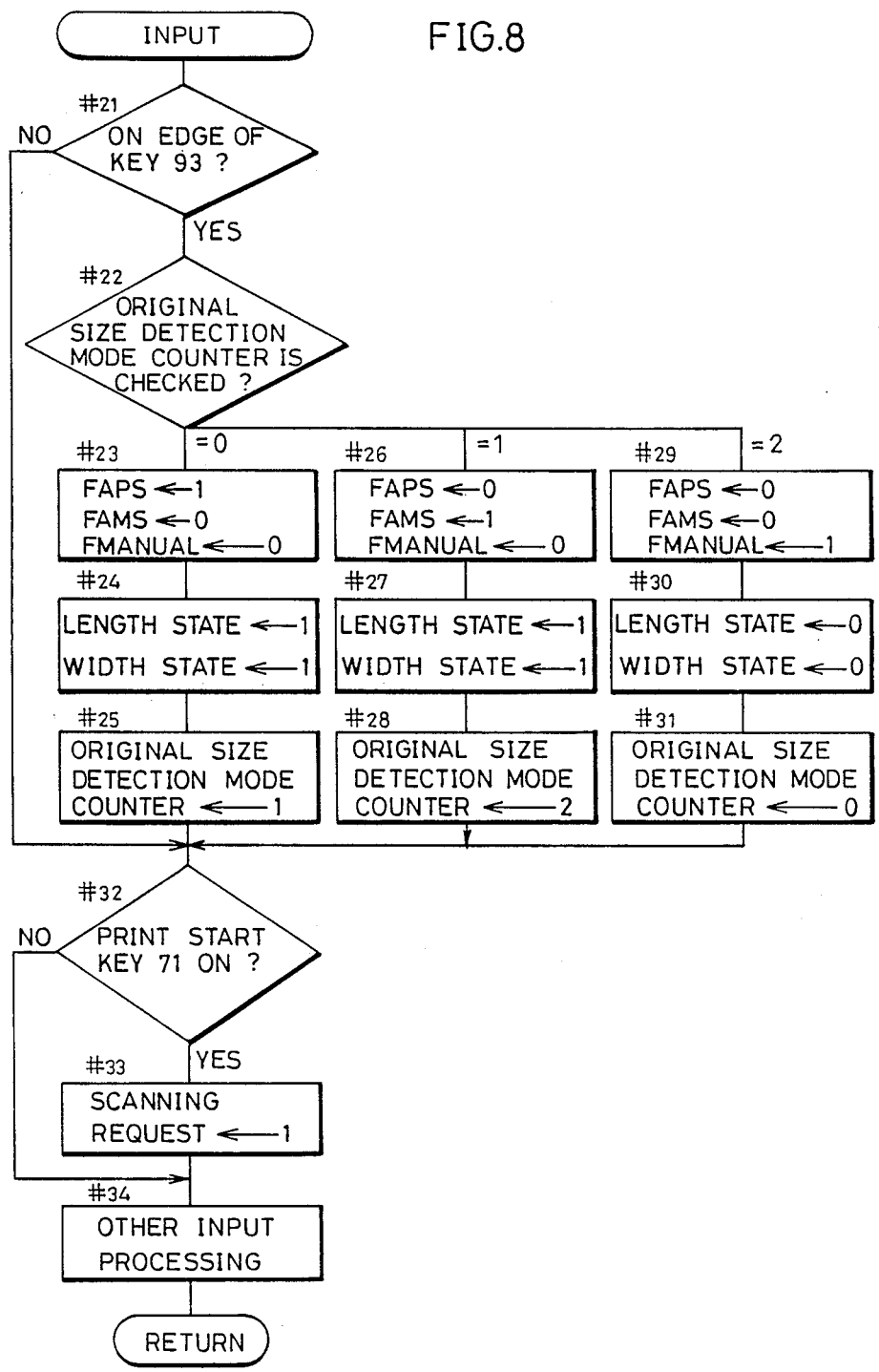
FIG. 8 is a flow chart showing concrete procedures of the input routine of FIG. 7.

FIG. 8 is a flow chart of the input routine of step 3 shown in FIG. 7.

In step 2, it is determined based on the on-edge of the mode switching key 93 whether the key 93 is pressed or not. If it is pressed, procedures starting from step 22 are executed.

In step 22, the content of the original size detection mode counter is checked and a detection mode is selected according to the content.

The detection modes include three modes, namely, an automatic paper selection mode (APS mode) for selecting a paper size based on the result of the detection of the original size and a preset magnification, an automatic magnification selection mode (AMS mode) for setting a copying magnification based on the result of the original size detection and a preset size of paper, and a manual mode for manually selecting paper size and setting a copying magnification without original size detection. When any of the detection modes is selected, it is displayed on the corresponding one of the mode display elements 93a to 93c.

In the APS mode, a flag FAPS indicating the APS mode is set to 1 and flags FAMS and FMANUAL indicating the other detection modes are reset to 0 (in step 23). A length state and a width state are set to 1 to execute original size detection procedures (in step 24) and the content of the original size detection mode counter is set to 1 (in step 25).

In the AMS mode, the flag FAMS indicating the AMS mode is set to 1 and the flags showing the other detection modes are reset to 0 (in step 26). The length state and the width state are set to 1 (in step 27) and the content of the original size detection mode counter is set to 2 (in step 28).

In the manual mode, the flag FMANUAL indicating the manual mode is set to 1 and the flags indicating the other detection modes are reset to 0 (in step 29). The length state and the width state are reset to 0 so as not to execute original size detection (in step 30) and the content of the original size detection mode counter is reset to 0 (in step 31).

In the above described procedures, each time the mode switching key 93 is pressed, switching is effected in a rotating order of the APS mode, the AMS mode, the manual mode, the APS mode etc.

In step 32, it is determined whether the print start key 71 is pressed or not. If it is pressed, the flag requesting scanning is set to 1 and control according to the above described detection mode is started.

In step 34, signals from other keys on the operation panel 70, other sensors located in the copying apparatus and the like are inputted.

Figure 9:
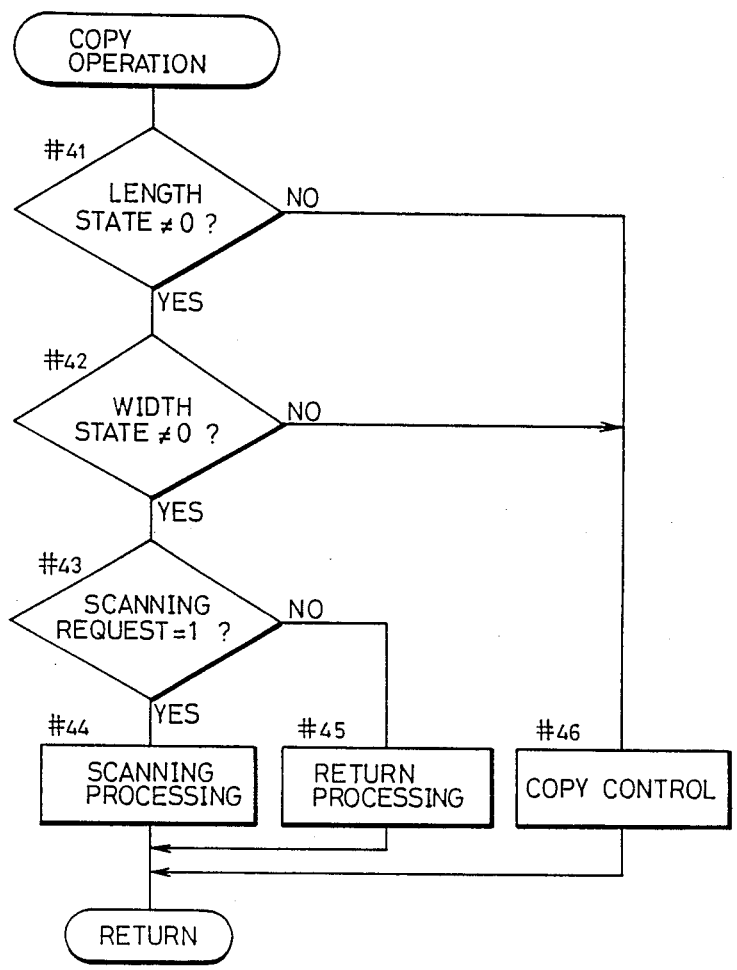
FIG. 9 is a flow chart showing concrete procedures of the copy operation routine of FIG. 7.

FIG. 9 is a flow chart of the copy operation routine of step 6 shown in FIG. 7.

The length state and the width state serve to control original size detection and during the detection, any of 1 to 4 is maintained dependent on the state at that time. Those states are reset to 0 in two cases, namely, in the case of the manual mode where original size detection is not effected and in the case in which the optical system 10 returns to the home position after original size detection.

First, in steps 41 and 42, it is determined whether original size detection is being effected or not dependent on whether the length state and the width state are not 0. If it is determined that the original size detection is not effected, the program proceeds to step 46 and processing for forming copy (including processing in standby state) is executed. If it is determined that the original size detection is effected, processing starting from step 43 is executed.

In step 43, presence or absence of a scanning request is checked. If the scanning request is issued, the scanner 31 effects scanning in step 44. If the scanning request is not issued, the scanner 31 returns to the initial position in step 45.

Figure 10A:
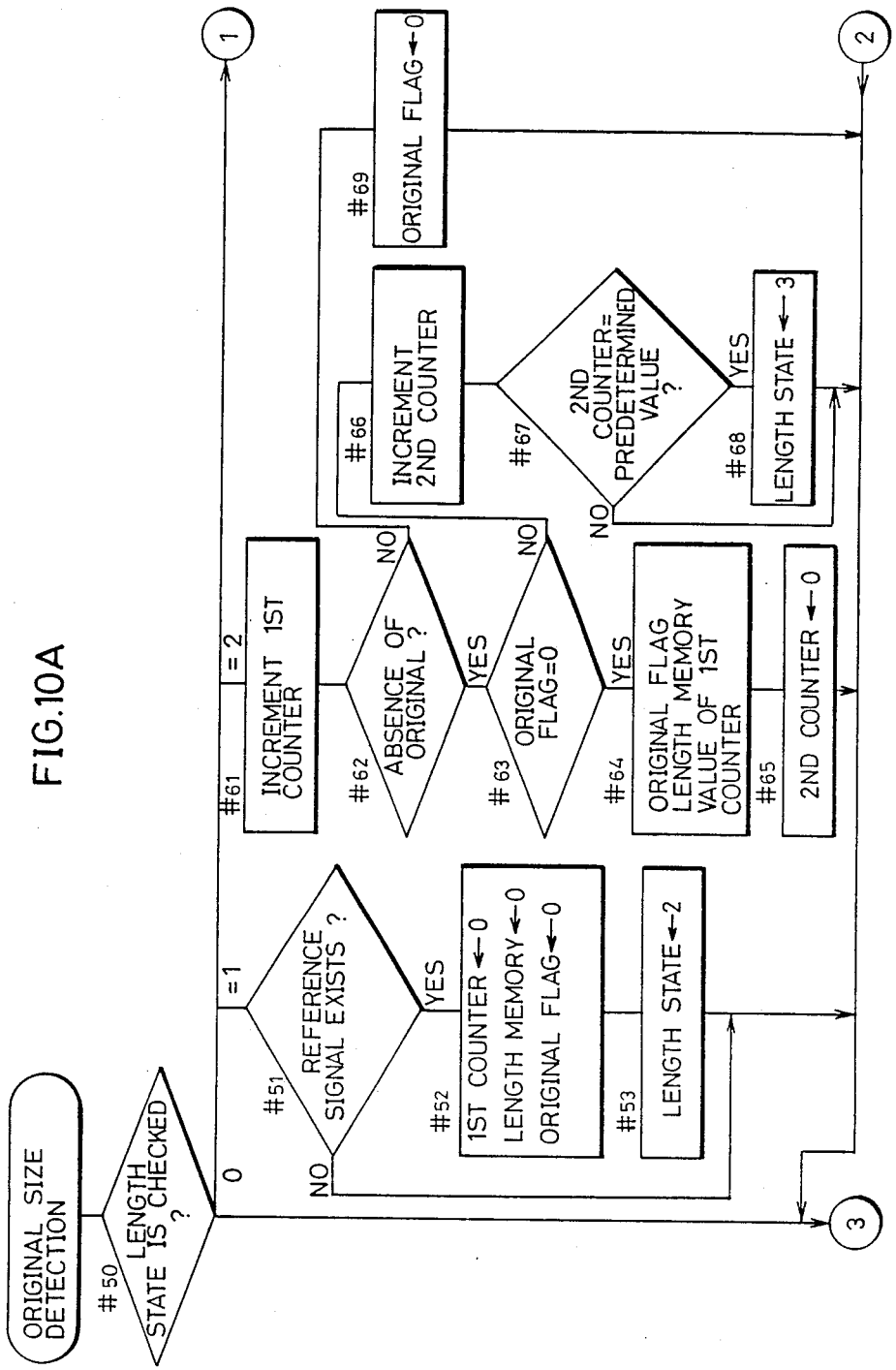
Figure 10C:
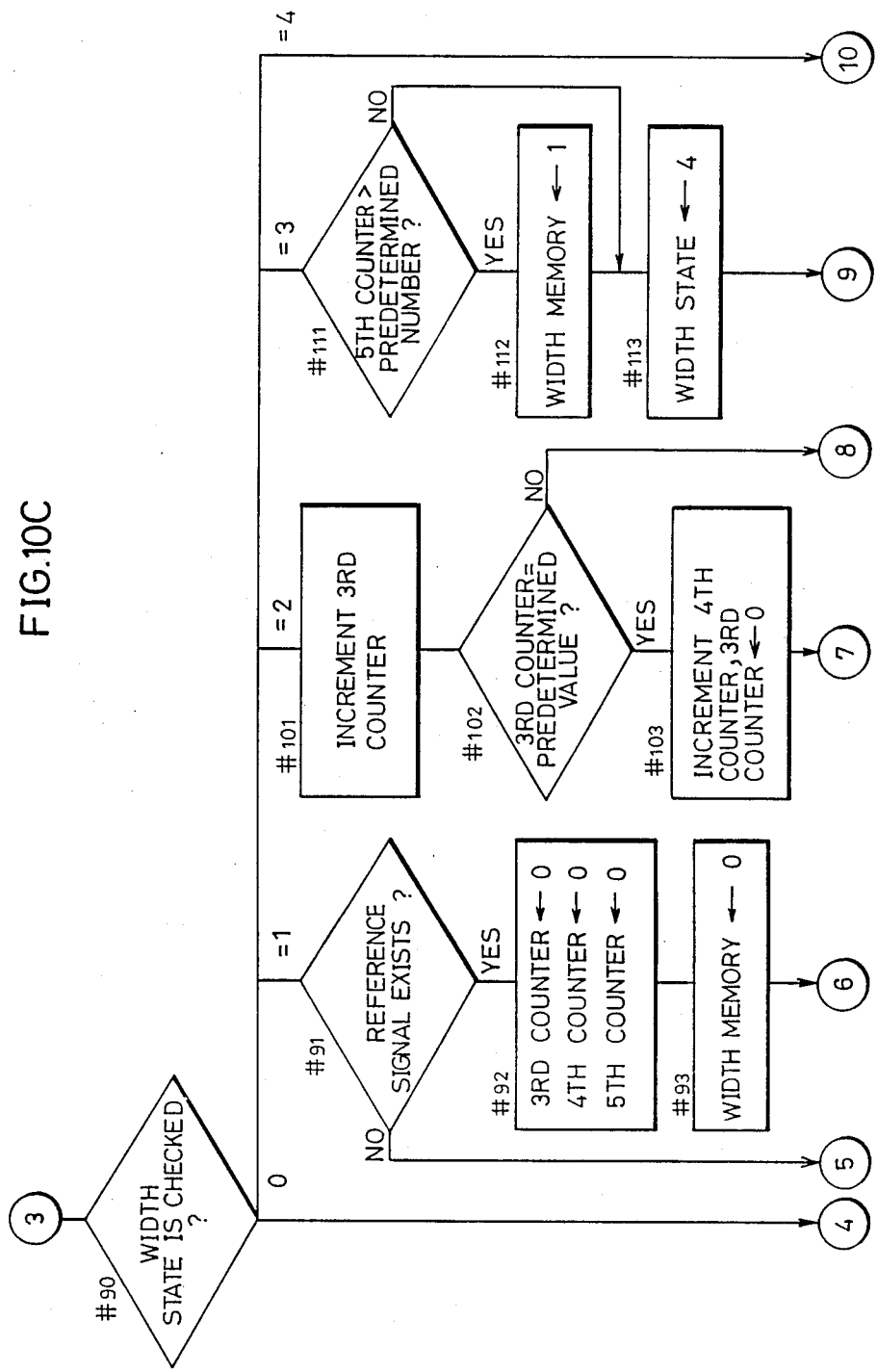
Figure 10D:
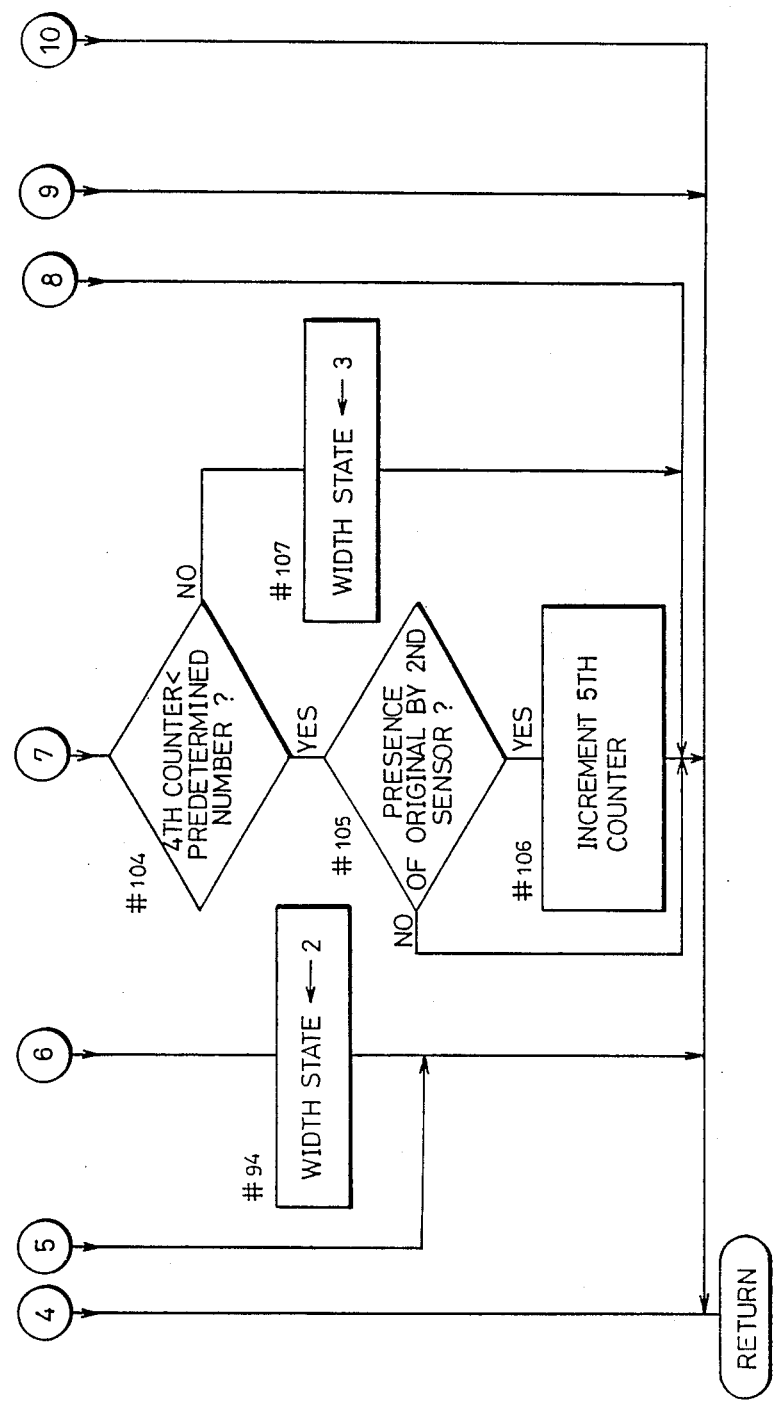

FIGS. 10A to 10C are flow charts of the original size detection routine of step 8 shown in FIG. 7.

In step 50, the content of the length state is checked and if the length state is any of 1 to 4, branching is effected to any of steps 51, 61, 71 and 81.

If the length state is 1 or 2, the length of the original is detected. If the length state is 3, the original size is detected based on the length of the original and the set direction of the original.

If the APS mode or the AMS mode is selected, the length state is set to 1 in step 24 or 27 and accordingly processing starting from step 51 is executed.

If the manual mode is selected, the length state is 0 and accordingly the program jumps to step 90 without executing the above mentioned steps.

If the length state is 1, it is determined first in step 51 whether a reference signal is outputted from the reference position sensor 50 in the moving path of the scanner 31. If the reference signal is outputted, the first counter is cleared to measure the length of the original and the length memory which stores the content of the first counter at the time of change of determination from presence of the original to absence of the original and the original flag indicating presence or absence of the original are initialized.

In step 53, the length state is set to 2. After that, the program proceeds to step 90 for detecting the set direction of the original. In the following, detection processing of the length of the original will be first described.

When the state is 2, the first counter is incremented in step 61 and the output of the first sensor 51 is checked in step 62 to determine presence or absence of the original D in the longitudinal direction. If it is determined by comparison between the output signal and the reference value that the original exists (in the case of NO in step 62), the original flag is reset to 0 (indicating presence of the original).

When absence of the original is determined by the scanning of the scanner 31 (in the case of YES in step 62), the original flag is checked (in step 63). At the time when the detection changes from presence of the original to absence of the original, the original flag is still maintained at 0. Accordingly, the program proceeds to step 64, and processing at the time of change from presence of the original to absence of the original is effected.

More specifically, in step 64, the original flag is set to 1 (indicating absence of the original) and the content of the first counter at that time is stored in the length memory. Then, in step 65, the second counter is cleared to start counting, so that it is determined whether the state of absence of the original continues or not.

Subsequently, unless the state of the absence of the original changes, the program proceeds to step 61, step 62, step 63 and step 66.

In step 66, the second counter is incremented. In step 67, it is determined whether the content of the second counter attains a predetermined value or not. If it attains the predetermined value, the length state is set to 3 (in step 68).

The above described flow of processing applies to the case of the original having little contrast of density. However, originals used in reality have various density patterns. For example, in the case of an original having a black solid area, intensity of reflected light is considerably lowered if the black solid area is scanned, causing the signal of the first sensor 51 to be lowered to the level of absence of the original. Even in such a case, the length of the original can be correctly detected by the below described processing.

In the following, the original length detection operation will be described also with reference to FIG. 6 showing an example of change of data for explaining the detection operation.

When the scanner 31 is in the area B1 shown in FIG. 6, that is, the first sensor 51 detects the area B1 shown in FIG. 6, it is determined that the document exists and accordingly the determination in step 62 is NO. Thus the program proceeds to step 69.

When the first sensor 51 reaches the point B2 shown in FIG. 6, the determination changes from presence of the original to absence of the original and the determination in step 62 is YES, whereby the program proceeds to step 63. Since the original flag is still 0, the determination in step 63 is YES and the program proceeds to step 64, where the original flag is set to 1.

When the first sensor 51 detects the area B3 in FIG. 6 (for example, a black solid area), absence of the original is determined and since the original flag is 1, processing starting with step 66 is executed.

If the area B3 is within the length corresponding to the predetermined value in step 67, a determination NO is given in step 62 before the determination YES in step 67, when the first sensor 51 attains the point B4. Then, when the original flag is reset to 0 in step 69 and absence of the original is determined, the second counter is reset in step 65. Accordingly, update processing for the length state in step 68 is not executed and detection of the original length is continued.

Thus, the erroneous determination of absence of the original due to a black solid area in the original is disregarded finally.

When the first sensor 51 detects the area B5 and the point B6, the same processing as the above described processing for the area B1 and the point B2 is carried out and the content of the length memory is updated to the count value of the first counter at the point B6.

If the area B7 is larger than the predetermined time t corresponding to the predetermined value in step 67, it is determined that there is no original in reality when the first sensor 51 attains the point B8, and the length state is updated to 3 in step 68, whereby detection of the length of the original is terminated.

When the length state is 3, it is determined in step 71 whether the width state is 4 or not, that is, whether detection of the original in the transverse direction is terminated or not. In the case of NO, processing starting with step 72 is bypassed and there is a wait until the width state becomes 4.

When the width state becomes 4, the original size and the set direction of the original are determined in step 72 based on the result of detection of the original length and the result of detection of the original in the transverse direction.

In this embodiment, the sizes in the scanning direction of the A3 to A5 and B4 to B6 sizes are different except for the case of A4 width (its longer sides perpendicular to the scanning direction) and A5 length (its longer sides parallel to the scanning direction) and the case of B5 width and B6 length. Accordingly, the set direction of the original is determined only by the result of detection of the original length. Only for the above mentioned cases, the set direction is determined based on the result of detection of the original in the transverse direction. Accordingly, if the result of detection in the transverse direction indicates presence of the original in the above mentioned cases, the set direction is widthwise (A4 or B5), and if the result indicates absence of the original, the set direction is lengthwise (A5 or B6).

Then, in step 73, the scanning request is set to 0 to return to the scanner 31 and the length state is updated to 4 in step 74.

When the length state is 4, it is determined in step 81 whether the scanner 81 returns to the home position or not. If the scanner 31 returns to the home position, the length state and the width state are both set to 0 in step 82 and the program returns to the main routine.

Next, processing starting with step 90 for detection of the original in the transverse direction will be described.

In step 90, the content of the width state is checked and if the width state is any of 1 to 3, branching is effected to any of steps 91, 101 and 111.

When the APS mode or AMS mode is selected, the width state is 1 and accordingly processing starting with step 91 is executed.

When the manual mode is selected, the width state is 0 and accordingly the program returns to the main routine without executing the above mentioned steps.

When the width state is 1, it is first determined in step 91 whether the reference signal is outputted as a result of operation of the reference position sensor 50. If the reference signal is outputted, a third counter for defining an interval of measurement, a fourth counter for counting the number of measurements, and a fifth counter for counting the number of determinations of presence of the original based on the measurement results are cleared in step 92.

In step 93, the width memory for storing the detection result in the transverse direction is cleared and the width state is updated to 2 in step 94.

When the width state is 2, the third counter for defining the intervals of measurements is incremented and it is determined in step 102 whether the content of the third counter attains a predetermined value or not.

If it does not attain the predetermined value, the program returns to the main routine. If it attains the predetermined value, processing starting with step 103 is executed.

In step 103, the fourth counter is incremented and the third counter is cleared. Thus, processing starting with step 102 is executed for each predetermined cycle.

In step 104, the count value of the fourth counter is checked, that is, it is determined whether measurement is effected by a predetermined number of times or not. If the number of measurements is smaller than the predetermined number, the program proceeds to step 105 to determine presence or absence of the original based on the signal from the second sensor 52. If the original exists, the fifth counter is incremented in step 106. If the original does not exist, the step 106 is bypassed.

Thus, the fifth counter counts the number of determinations of presence of the original.

If measurements are effected by the predetermined number of times (in the case of NO in step 104), the width state is updated to 3 in step 107 and the program returns to the main routine.

If the width state is 3, the fifth counter is checked in step 111 to determine whether the number of determinations of presence of the original is larger than the predetermined number or not. If it is larger than the predetermined number, the width memory is set to 1 (indicating presence of the original) in step 111. If it does not attain the predetermined number, the step 112 is bypassed. Finally, the width state is updated to 4 in step 113 and the program returns to the main routine.

If the width state is 4, the program immediately returns to the main routine.

According to the above described embodiment, the length of the original can be detected by the first sensor 51, even if absence of the original is determined during detection of the original size due to change in intensity of light dependent on the pattern or density of the original, such erroneous determination is not taken into account. More specifically, the length of the original is correctly detected without being erroneously determined to be shorter than the actual length.

In addition, by determining presence or absence of the original in the transverse direction by the second sensor 52, it is made possible to detect easily the set direction of the original.

Based on the results of determination of the length of the original and the set direction thereof, the original size and the set direction can be detected correctly.

The length of the original D can be detected at the time of scanning for a predetermined period after the scanning of the length of the original D. Accordingly, if the length of the original D is short, the scanner 31 does not need to effect full scanning over the whole length of the platen glass 16 and it becomes possible to detect the original size for a short time and to suppress lowering of the first copy speed of the copying apparatus.

In the above described embodiment, the first and second sensors 51 and 52 are provided near the lens 14 so as to receive light reflected from the original D irradiated by the light source 11a and to scan the original D in the longitudinal direction through movement of the scanner 31 having the light source 11a. However, a special projector may be used in place of the light source 11a. In addition, the first and second sensors 51 and 52 may be attached to the scanner 31. Alternatively, the first and second sensors 51 and 52 may be driven by other drive means than the scanner 31. The scanner 31, the first and second sensors 51 and 52 and the like may be fixed and the platen glass 16 together with the original D may be moved.

In the above described embodiment, the first to fifth counters for detecting the original size, the comparing means and the determining means are implemented by means of software using the programs in the CPU 201. However, they may be implemented by hard logics and the like.

In the above described embodiment, the preliminary scanning is terminated based on the detection signal of the sensor 51. The termination of the preliminary scanning may be detected by counting of a timer from turn-on of the sensor 50 for example, or by providing a new switch at a scanning end position of a predetermined scanner. More specifically, the termination of scanning can be detected by setting the length of the scanning to a predetermined length larger than the maximum length of the original size.

In addition, although standard sizes such as A4, A5 and B5 are used as the original sizes, the actual dimensions of the original (the length and the width) may be used.

Furthermore, although the above described embodiment adopts a slit exposure system in which an irradiation area of the platen glass is moved together with the movement of the scanner 31, the present invention is also applicable to other systems in which the whole area of the platen glass is simultaneously subjected to exposure and detection of the sensors 51 and 52 is successively effected for each predetermined area of the platen glass.

According to the present invention, even if intensity of light changes dependent on the pattern or density of the original to cause erroneous determination of absence of the original during detection of the original size, such erroneous determination can be disregarded. Thus, the length of the original can be correctly detected without being determined to be shorter than the actual length and accordingly the original size can be correctly detected, which makes it possible to improve reliability of copy operation.

In addition, the original size can be detected at the time of scanning for a predetermined period after termination of scanning for the length of the original. Consequently, if the length of the original is short, it is not necessary to effect full scanning over the whole length of the platen and it becomes possible to detect the original size for a short time and to suppress lowering of the first copy speed of the copying apparatus.

Further, since the original size and the set direction of the original are detected by a small number of sensor means, the image forming mechanism has a simple mechanical construction, which makes it possible to reduce the manufacturing cost.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An original size detecting apparatus comprising:
   platen for supporting an original;
   irradiating means for irradiating said platen on which the original is placed;
   first detecting means for receiving light reflected from said platen irradiated by said irradiating means and detecting intensity of the received reflected light;
   performing means for performing relative movement between said platen and said first detecting means while activating said irradiating means;
   moving amount measuring means for measuring an amount of the relative movement;
   first reference level detecting means for detecting coincidence between an output of said first detecting means and a first reference level;
   storing means for storing the amount of the relative movement measured by said moving amount measuring means every time when said first reference level detecting means produces an output; and
   determining means, after an end of the relative movement, for determining a size of the original based on the amount of the relative movement finally stored in said storing means.

2. An original size detecting apparatus in accordance with claim 1, wherein
   said storing means has a storage area for storing the measured amount of the relative movement and updates the amount stored in said storage area to the amount measured by said moving amount measuring means each time said first reference level detecting means provides an output.

3. An original size detecting apparatus in accordance with claim 2, wherein
   said determining means determines the size of the original based on the amount of the relative movement stored in said storage area.

4. An original size detecting apparatus in accordance with claim 1, further comprising
   time measuring means for measuring duration of time from the time of the coincidence till the output of said first detecting means is reduced under said first reference level,
   second detecting means for detecting the fact that the time measured by said time measuring means attains a predetermined time, and
   control means for terminating the relative movement in response to a detection output of said second detecting means.

5. An original size detecting apparatus in accordance with claim 1, further comprising
   second light intensity detecting means for receiving reflected light at a position of said platen different from the position of the platen where said first light intensity detecting means receives light, and detecting intensity of the received reflected light, and
   comparing means for comparing a detection output of said second light intensity detecting means and a second reference level,
   said determining means determining the size of the original based on a comparison output of said comparing means and the amount of the relative movement stored in said storing means.

6. An original size detecting apparatus in accordance with claim 1, further comprising
reference signal output means for outputting a reference signal when said performing means passes by a position corresponding to an end of said platen
said moving amount measuring means starting measurement in response to the output of said reference signal output means.

7. An original size detecting apparatus in accordance with claim 1, wherein
said original includes an area where intensity characteristics of the reflected light are the same as those of said platen.

8. An original size detecting apparatus comprising:
a platen on which an original is placed,
irradiating means for irradiating said platen on which the original is placed,
first light intensity detecting means for receiving light reflected from said platen irradiated by said irradiating means and detecting intensity of the received reflected light,
performing means for performing relative movement between said platen and said first detecting means while activating said irradiating means,
moving amount measuring means for measuring an amount of the relative movement,
first detecting means for detecting coincidence between a detection output of said light intensity detecting means and a first reference level,
storing means for storing the amount of the relative movement measured by said moving amount measuring means in response to a detection output of said first reference level detecting means,
time measuring means for measuring duration of time from the time of the coincidence till the output of said first detecting means is reduced under said first reference level,
second detecting means for detecting the fact that the time measured by said time measuring means attains predetermined time, and
determining means for determining a size of said original based on the amount of the relative movement stored in said storing means, in response to a detection output of said time detecting means.

9. An original size detecting apparatus in accordance with claim 8, wherein
said storing means has a storage area for storing the measured amount and updates the amount stored in said storage area to the amount measured by said moving amount measuring means each time said first reference level detecting means provides an output.

10. An original size detecting apparatus in accordance with claim 9, wherein
said determining means determines the size of the original based on the amount stored in said storage area.

11. An original size detecting apparatus in accordance with claim 8, further comprising
second light intensity detecting means for receiving reflected light at a position of said platen different from the position of the platen where said first light intensity detecting means receives light, and detecting intensity of the received reflected light, and
comparing means for comparing a detection output of said second light intensity detecting means and a second reference level,
said determining means determining the size of the original based on a comparison output of said comparing means and the amount stored in said storing means.

12. An original size detecting apparatus in accordance with claim 8, wherein
said performing means includes a scanning member movable along said platen.

13. An original size detecting apparatus in accordance with claim 12, wherein
said scanning member holds said irradiating means and a mirror for guiding the reflected light from said platen to said first reference level detecting means.

14. An original size detecting apparatus in accordance with claim 8, wherein
said original includes an area where intensity characteristics of the reflected light are the same as those of said platen.

15. An original size detecting apparatus comprising:
a platen on which an original is placed,
irradiating means for irradiating said platen on which the original is placed,
first light intensity detecting means for receiving reflected light from a first position of said platen irradiated by said irradiating means and detecting intensity of the received reflected light,
second light intensity detecting means for receiving reflected light from a second position different from said first position of said platen irradiated by said irradiating means and detecting intensity of the received reflected light,
performing means for performing relative movement between said platen and said first light intensity detecting means while activating said irradiating means,
moving amount measuring means for measuring an amount of the relative movement,
reference level detecting means for detecting the fact that a detection output of said first light intensity detecting means attains a first reference level,
first storing means for storing the amount of the relative movement measured by said moving amount measuring means, in response to a detection output of said first reference level detecting means,
comparing means for comparing a detection output of said second reference level detecting means and a second reference level,
first determining means for determining a length of said original along the moving direction of the relative movement based on the amount stored in said storing means when the detection output of said first light intensity detecting means attains a predetermined state after said reference level detecting means provides the detection output, and
second determining means for determining a dimension of said original in a direction perpendicular to the moving direction of the relative movement, based on a comparison output of said comparing means.

16. An original size detecting apparatus in accordance with claim 15, further comprising
reference signal output means for outputting a reference signal when said performing means passes by a position corresponding to an edge of said platen, control means for enabling said comparing means in response to the output of said reference signal output means for each elapse of a predetermined time, and second storing means for storing a result of comparison of said comparing means enabled by said control means, said second determining means determining a length of said original based on the comparison result of said second storing means.

17. An original size detecting apparatus in accordance with claim 16, wherein said second reference level is intensity of light indicating that the original exists at said second position of said platen when the intensity exceeds the detection output of said second light intensity detecting means.

18. An original size detecting apparatus in accordance with claim 17, wherein said second storing means stores, as the comparison result of said comparing means, the number of times the detection output of said second light intensity detecting means exceeds said second reference level, and said second determining means determines that the original exists at the second position of said platen when said stored number exceeds a predetermined number.

19. An original size detecting apparatus in accordance with claim 18, further comprising third determining means for determining a size of said original and a set direction thereof with respect to the moving direction of the relative movement for said original.

20. An original size detecting method comprising the steps of:

placing an original on a platen, irradiating said platen with a predetermined width for scanning, measuring an amount of scanning for said platen with passage of time, receiving reflected light from said platen irradiated and measuring intensity of the received reflected light with passage of time, measuring elapsed time in a state in which the intensity of the received reflected light attains a reference intensity, and detecting a size of said original based on the measured amount of scanning when said elapsed time exceeds a predetermined time.

21. An original size detecting method in accordance with claim 20, wherein said measuring step includes measuring reflected light from a first distance from an edge of said platen in a direction perpendicular to the scanning direction and from a second position at a second distance different from said first position, and said detecting step includes detecting a dimension of said original in said scanning direction based on intensity of the reflected light from said first position, and detecting a dimension of said original in a direction perpendicular to said scanning direction based on intensity of the reflected light from said second position.

22. An original size detecting method in accordance with claim 20, further comprising the step of terminating scanning of said platen when said elapsed time exceeds the predetermined time.

* * * * *

UNITED STATES PATENT AND TRADEMARK OFFICE
CERTIFICATE OF CORRECTION

PATENT NO. : 4,978,992

DATED : December 18, 1990

INVENTOR(S) : Keiji Kusumoto, et al.

It is certified that error appears in the above-identified patent and that said Letters Patent is hereby corrected as shown below:

In col. 4, line 14, change "FIGS. 5A-5E" to --FIGS. 5A-5F--.

In col. 7, line 19, after "position)", insert --.-- (period).

In col. 8, line 37, change "step 2" to --step 21--.

In col. 11, line 51, change "scanner 81" to --scanner 31--.

In col. 14, line 9 (claim 1, line 2), before "platen", insert --a--.

In drawing Sheet 5 of 13, change "FIG. D" to --FIG. 5D--.

Signed and Sealed this

Twelfth Day of May, 1992

Attest:

DOUGLAS B. COMER

*Attesting Officer*     *Acting Commissioner of Patents and Trademarks*